(No Model.)

R. M. ROSE.
FARE REGISTER AND RECORDER.

No. 244,314.　　　　　　　　　　Patented July 12, 1881.

Witnesses:　　　　　　　　　　Inventor:

UNITED STATES PATENT OFFICE.

REUBEN M. ROSE, OF BROOKLYN, NEW YORK.

FARE REGISTER AND RECORDER.

SPECIFICATION forming part of Letters Patent No. 244,314, dated July 12, 1881.

Application filed February 12, 1881. (No model.)

*To all whom it may concern:*

Be it known that I, REUBEN M. ROSE, of Brooklyn, in the county of Kings and State of New York, have invented certain new and useful Improvements in Passenger and Fare Indicators and Registers, of which the following is a specification.

The principal object of my invention is to provide a passenger and fare indicator and register of very simple construction for street-cars and other vehicles, which, in addition to indicating the fares upon a visible dial as they are paid and "rung up" by the conductor, will also register them upon a dial which is inaccessible to the conductor and removable from the case of the instrument, and which forms a permanent and infallible record of all fares rung up.

The invention consists in the combination, in an indicator or register, of a box or case, a visible dial in the front part thereof, a removable dial behind said visible dial, and concealed thereby, a single shaft and mechanism for turning it step by step, an index-hand attached to said shaft and moving over the front of said visible dial, and a radial arm also attached to said shaft behind the visible dial, and carrying a device for marking on said removable dial. The index-hand which moves over the visible dial is preferably connected with the shaft by a friction device or otherwise, so that it may be released therefrom, and I combine with the said index-hand a pinion, gear-wheel, and a spring for turning said gear-wheel to return the said index-hand to a zero-point when it is released from its shaft.

The invention also consists in the combination, in an indicator and register, of a shaft and mechanism for turning it, a removable dial, a screw-threaded radial arm carried by said shaft, and a toothed wheel mounted upon said screw-threaded arm and bearing upon said dial, whereby as the shaft is turned the said wheel is rotated by contact with the dial, and, being moved along the screw-threaded arm, describes a spiral line of perforations or indentations on the dial.

The invention also consists in various novel combinations of parts and details of construction, to be hereinafter described.

Figure 2:
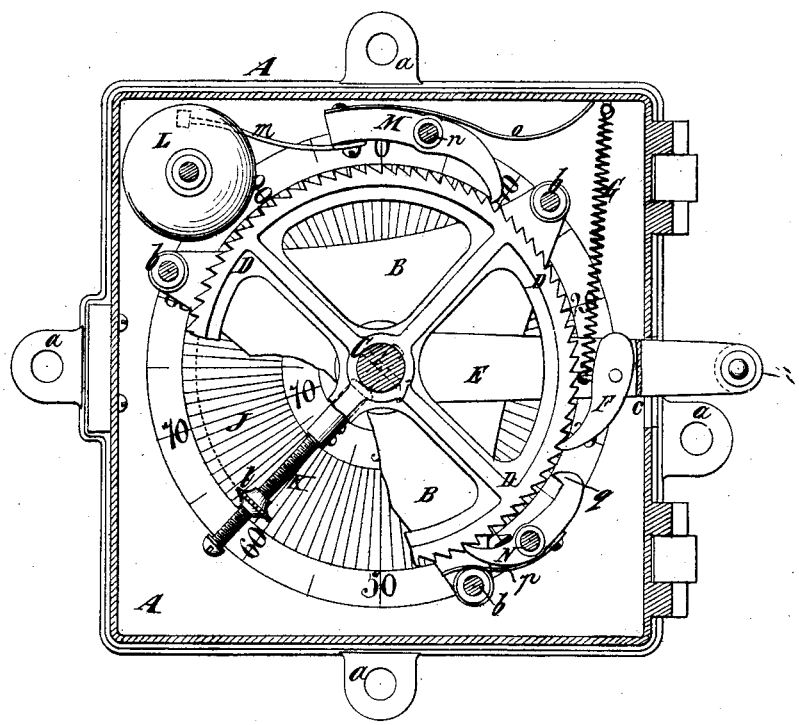
Figure 1:
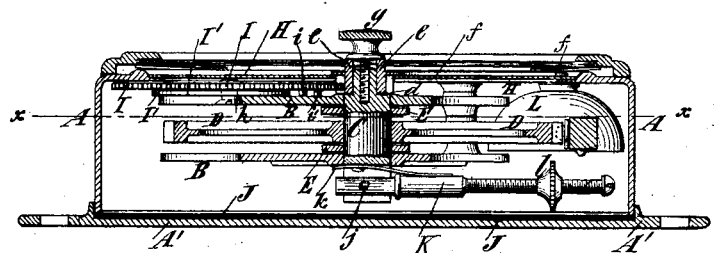
Figure 3:
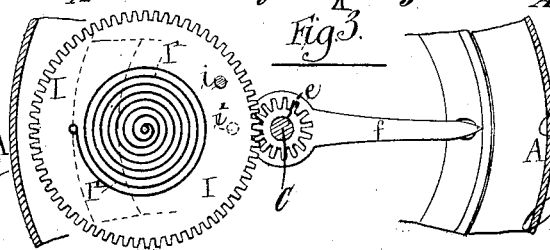

In the accompanying drawings, Figure 1 represents a sectional view, in a plane parallel with the central spindle or shaft, of a fare indicator and register embodying my invention. Fig. 2 represents a horizontal section thereof upon the dotted line *x x*, Fig. 1; and Fig. 3 represents a diagram view of the index-hand and gear-wheel and spring for turning it to zero when released.

Similar letters of reference designate corresponding parts in all the figures.

A represents the box or case of the fare indicator and register, which may be advantageously composed of metal, and is hinged to a back plate, A', which is provided with lugs *a*, for the reception of screws for securing the indicator and register in a car.

B B designate plates, the form of which are shown clearly in Fig. 2, and which are held rigidly within the case A by screws *b*, and serve to support and retain in place the internal mechanism of the indicator and register.

C designates a central shaft, which is mounted in bearings in the plates B B, in which it is free to rotate. Upon the shaft C is rigidly secured a ratchet-wheel, D, having any considerable number of teeth—say, for instance, one hundred (100;) and E designates a lever, which is bifurcated, so as to embrace said wheel, and the inner ends of which fit loosely upon the shaft C, so as to turn freely thereon. The lever E projects through an opening or slot, *c*, in the side of the case A, and is free to be moved by the conductor to ring up a fare, its movement being limited by the size of the opening *c*. In the said lever E is pivoted a pawl, F, which is adapted to engage with the teeth of the wheel D; and G designates a spring, connected at one end to said pawl and at the other end to the case A. The spring G serves to keep the pawl F always pressed against the ratchet-wheel D, and it also serves to raise the lever E after being pulled down by the conductor.

In lieu of the ratchet-wheel and pawl, other mechanism might be employed for giving the shaft C a step-by-step rotary movement, the mechanism being of such a nature that the lever E would move free of the shaft when drawn upward by the spring G.

In the front of the case A is a dial, H, which is clearly visible, and is divided into a number of spaces corresponding to the number of teeth in the ratchet-wheel D. The end of the shaft C which projects through this dial is turned down so as to form a shoulder, $d$, and upon such turned-down portion is fitted a hub, $e$, which is provided with gear-teeth, so as to constitute a pinion, and from which projects an index-hand, $f$, which is moved over the dial H by the turning of the shaft C. The shaft C is intended to have an intermittent motion in one direction only, while the index-hand $f$ is intended to be turned back to a zero point after each trip. The hand $f$ is not secured rigidly to the shaft C, but may be clamped thereon by means of a thumb-screw, $g$, which is inserted in the end of the shaft, and serves to clamp the hub $e$ of the hand $f$ tightly between it and the shoulder $d$ upon the shaft, so as to turn therewith.

I designates a gear-wheel, mounted upon a fixed stud, $h$, and engaging with the gear-teeth upon the hub $e$; and I' designates a volute spring, attached at one end to a fixed stud. While the hand $f$ is being moved over the dial H by the step-by-step movement of the shaft C the wheel I is turned, compressing the spring I', and as soon as the screw $g$ is turned to release the hub $e$ of the hand $f$ from the shaft C the wheel I is turned in the reverse direction by the resilience of the spring I' until the pin $i$ comes in contact with the pin $i'$ on the plate B, when the index-hand $f$ will be at zero-point on the dial H.

In the back of the case A, and held in place by being clamped between the edge of the case A and the back plate, A', is a removable dial, J, which is preferably composed of paper, and is divided into radial spaces, as shown in Fig. 2, the number of spaces being equal to the number of teeth of the wheel D.

Upon the back end of the shaft C is secured a radial arm, K, which is pivoted by a pin, $j$, in a slot in the end of the shaft, and is impelled toward the dial J by a leaf-spring, $k$. (Shown in Fig. 1.) The arm K is screw-threaded for the greater part of its length, and upon it is fitted a toothed wheel, $l$, which is caused to press upon the dial J by the action of the spring $k$. As the shaft C is turned the arm K moves with it, and the wheel $l$, being turned by contact with the paper, is moved inward or outward by the screw-thread upon the arm K, so that it produces a continuous spiral line of perforations, indentations, or marks in the dial J. Thus it will be seen that while the conductor may readily turn the index-hand $f$ back to the zero the arm K cannot be so moved back; but the wheel $l$ makes a permanent and reliable record of all the fares rung up in a day, and may be compared with the conductor's returns for a day.

It will be seen that the dial J is invisible and inaccessible to the conductor, and hence it cannot be tampered with by him.

L designates a gong secured in the case A; and $m$ designates the hammer thereof, which is fixed to a pawl, M, which is pivoted at $n$, and is pressed against the toothed periphery of the wheel D by a spring, $o$. Hence for every tooth that the wheel is advanced and for every movement of the lever E the bell is struck. The pawl M serves to prevent backward movement of the wheel D; but in order to guard more effectually against such movement I employ a stop-pawl, N, which, by a spring, $p$, is pressed into contact.

As shown in Fig. 2, the two pawls F and N have each just dropped into a tooth; and it will be seen that if the wheel D were not moved ahead quite a whole tooth the stop-pawl N might not catch a new tooth, and hence would permit of the wheel being turned slightly back and not record a fare. This is prevented by setting the third pawl M so that when the other two pawls are fully engaged it will be opposite a half-tooth, and hence when the lever E makes half its movement the bell will ring, and the wheel D is prevented from backward movement.

Instead of the screw-threaded arm and wheel $l$, any other suitable device for perforating or marking the dial J might be employed.

The pawl N is shown as having a projection or tooth, $q$, upon its rear end, which, when the pawl is in engagement with a tooth of the ratchet-wheel, stands at about the middle of one of the teeth. When the pawl is raised by a tooth of the ratchet-wheel the tooth $q$ is moved inward against one of the teeth of the wheel, and the wheel is thereby prevented from being moved more than one tooth at a time.

I am aware that the escapement-pawl of an ordinary watch or clock movement has two pallets, which engage alternately with the teeth of the escape-wheel; but said pawl is not a stop-pawl in the same sense as is the pawl N, for the escapement-pawl permits the free movement of the escape-wheel in winding, and regulates or controls the movement of said wheel in the opposite direction, while the stop-pawl N permits the free movement of the ratchet-wheel in one direction and positively precludes its movement in the other direction. The escape-pawl is not acted upon directly by a spring, as is my stop-pawl.

By my invention I provide a very reliable indicator and register for street-cars, which may be adapted for various other purposes.

What I claim as my invention, and desire to secure by Letters Patent, is—

1. The combination, in an indicator or register, of a box or case, a visible dial in the front part thereof, a removable dial behind said visible dial and concealed thereby, a single shaft and mechanism for turning it step by step, an index-finger attached to said shaft and moving over the front of said visible dial, and a radial arm also attached to said shaft behind the visible dial and carrying a device for marking on said removable dial, substantially as specified.

2. The combination, in an indicator and register, of a shaft and mechanism for turning it step by step, a visible dial, an index-hand detachably secured upon said shaft, and a spring and gear-wheels for returning it to a zero-point when released, a removable dial, and a radial arm carrying a device for marking upon said removable dial, substantially as specified.

3. The combination of the shaft C, the dial H, the index-hand $f$, having a toothed hub, $e$, the screw $g$, the wheel I, engaging with said hub, and the spring I', substantially as specified.

4. The combination, in an indicator and register, of a shaft and mechanism for turning it, a removable dial, a radial arm fixed to said shaft and externally screw-threaded, and a toothed wheel upon said arm adapted to bear upon and be rotated by contact with said dial, substantially as specified.

5. The combination of the shaft C, the removable dial J, the arm K, carrying the toothed wheel $l$, and fitting in a slot in said shaft, and the spring $k$, for impelling said arm to cause the wheel to bear upon the dial, substantially as specified.

REUBEN M. ROSE.

Witnesses:
FREDK. HAYNES,
ED. GLATZMAYER.